United States Patent [19]

Mimura

[11] Patent Number: 5,245,415
[45] Date of Patent: Sep. 14, 1993

[54] CHROMA ENCODER

[75] Inventor: Toshihiko Mimura, Yokohama, Japan

[73] Assignee: Canon Kabushiki Kaisha, Tokyo, Japan

[21] Appl. No.: 911,808

[22] Filed: Jul. 10, 1992

Related U.S. Application Data

[63] Continuation of Ser. No. 540,698, Jun. 20, 1990, abandoned.

[30] Foreign Application Priority Data

Jun. 21, 1989 [JP] Japan .................. 1-158743

[51] Int. Cl.$^5$ .................................. H04N 9/72
[52] U.S. Cl. ........................ 358/34; 358/23; 358/14
[58] Field of Search ............ 358/11, 13, 14, 18, 358/34, 40, 21, 171, 23

[56] References Cited

U.S. PATENT DOCUMENTS

| | | | |
|---|---|---|---|
| 4,124,869 | 11/1978 | Heitmann | 558/172 |
| 4,210,933 | 7/1980 | Heitmann | 358/172 |
| 4,766,485 | 8/1988 | Takayama et al. | 358/34 |

FOREIGN PATENT DOCUMENTS

| | | | |
|---|---|---|---|
| 0010880 | 1/1985 | Japan | 358/34 |
| 0241375 | 11/1985 | Japan | 358/171 |
| 0166689 | 7/1987 | Japan . | |

OTHER PUBLICATIONS

Lever et al. "Analogue Processing and Operation Controls" IBA Tech. Rev (GB), No. 8 Sep. 1976 pp. 16–50.

Primary Examiner—James J. Groody
Assistant Examiner—David E. Harvey
Attorney, Agent, or Firm—Fitzpatrick, Cella, Harper & Scinto

[57] ABSTRACT

A chroma encoder inputs an analog color-difference signal and outputs an appropriate chroma signal, and includes an A/D converter for converting the analog color-difference signal into a digital color-difference signal, and a calculator for sampling the pedestal level of the digital color-difference signal a predetermined number of times. The calculator then calculates the difference value between the average value of the sampled values and a predetermined value. A subtracter is provided for subtracting the difference value output from the calculator from the digital color-difference signal to obtain the chroma signal.

15 Claims, 4 Drawing Sheets

CHROMA ENCODER

This application is a continuation of application Ser. No. 07/540,698 filed Jun. 20, 1990, now abandoned.

BACKGROUND OF THE INVENTION

1. Field of the Invention

This invention relates to a chroma encoder, and more specifically to a circuit which forms a chroma signal from color-difference signals.

2. Related Background Art

In a known digital circuit for forming either an NTSC standard or PAL standard chroma signal from color-difference signals, the band of each color-difference signal is limited by a low-pass filter. Then, the color-difference signal is clamped by a clamping circuit in such a way that a pedestal level of an A/D (analog to digital) converted color-difference signal (e.g., 8 bits in this case) corresponds to a predetermined "128" ($2^7$) level, and the clamped color-difference signal is digitized by an A/D converter. Various digital processing steps are performed on the digitized color-difference signal, such as, converting the signal by a complement of two, adding a burst flag to the signal and performing time-division multiplexing on the signal to obtain a digital chroma signal. The digital chroma signal is then converted into an analog signal by means of a D/A (digital to analog) converter.

However, the above described circuit requires the correct adjustment of a clamp level of the clamping circuit, which is installed before the A/D converter, to a predetermined level because the clamp level affects the chroma signal as a carrier leak when the clamp level is beyond a predetermined value. The adjustment of the clamp level is not only difficult but also there is a possibility of causing a deviation of the clamp level by a change of temperature even if the adjustment is correct.

SUMMARY OF THE INVENTION

Accordingly, an object of the present invention is to provide a chroma encoder that can overcome the problems described above.

Another object of the present invention is to provide a chroma encoder that permits reproduction of images with high quality.

Still another object of the present invention is to provide a chroma encoder that forms chroma signals appropriately without being affected by a change of temperature.

It is still another object of the present invention to provide a chroma encoder that can provide, with a simple arrangement, a superior quality image.

In accordance with a preferred embodiment, the chroma encoder of the present invention includes an input circuit for inputting a color-difference signal. A correction circuit corrects the pedestal level of the color-difference signal by sampling the pedestal level a predetermined number of times. A forming circuit then forms a chroma signal using a corrected color-difference signal output from the correction circuit.

In accordance with another aspect of the present invention, the chroma encoder includes an input circuit for inputting an analog color-difference signal. An A/D converter converts the analog color-difference signal into a digital color-difference signal. A calculator samples the pedestal level of the digital color-difference signal a predetermined number of times, and calculates a difference value between an average value of the sampled values and a predetermined value. A subtracter subtracts the difference value output from the calculator from the digital color-difference signal. A combining circuit then performs digital AM modulation on the output of the subtracter, and combines two digital AM modulated color-difference signals to cause the two digital AM modulated color-difference signals to have different phases at 90 degrees in relation to each other.

In accordance with still another aspect of the invention, the chroma encoder forms a chroma signal from an analog color-difference line sequential signal having different offset degrees in their pedestal portions. An A/D converter converts the analog color-difference line sequential signal to a digital color-difference line sequential signal. A calculator samples each pedestal level of color-difference components of the digital color-difference line sequential signal a predetermined number of times, and calculates a difference value between an average value of the sampled values and a predetermined value. A subtracter subtracts the output of the calculator from the digital color-difference line sequential signal. A discrimination circuit discriminates the color-difference component of each line using the pedestal levels of the digital color-difference line sequential signal. A combining circuit converts the digital color-difference line sequential signal output from the subtracter into two different color-difference signals output simultaneously in accordance with a discrimination result by the discrimination circuit, then performs digital AM modulation of the two different color-difference signals, and combines the two digital AM modulated color-difference signals to cause the two digital AM modulated color-difference signals to have different phases at 90 degrees in relation to each other.

Other objects, features and advantages of the invention will become apparent from the following detailed description of the preferred embodiments of the present invention and the accompanying drawings.

DETAILED DESCRIPTION OF THE PREFERRED EMBODIMENTS

Preferred embodiments of the present invention will be described in detail herein with reference to the accompanying drawings.

Embodiment 1

Figure 1:
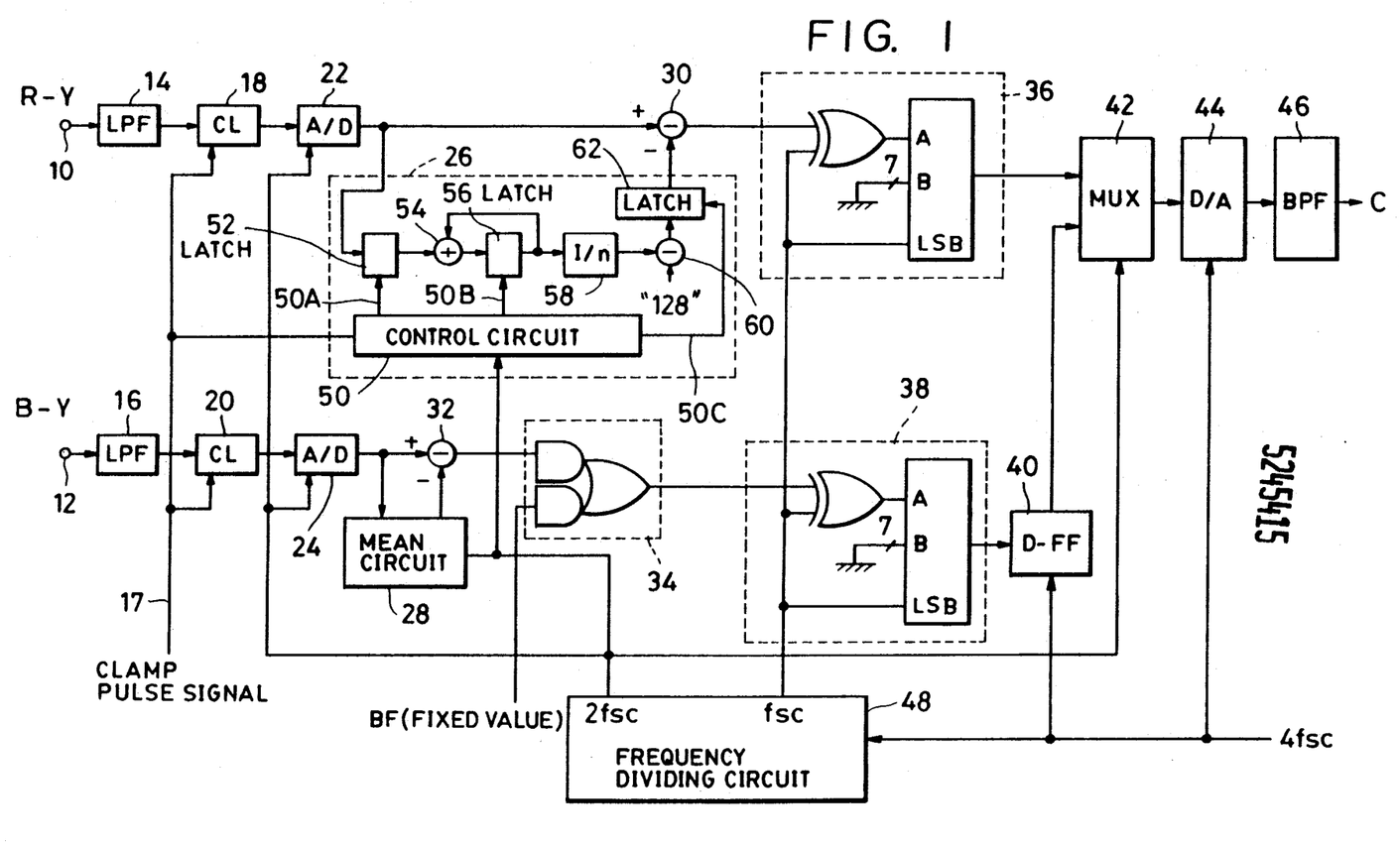
FIG. 1 is a block diagram of a chroma encoder according to a first embodiment of the present invention.

FIG. 1 is a block diagram of a chroma encoder according to the first embodiment of the present invention. The circuit shown in FIG. 1 includes an input terminal 10 for inputting a color-difference signal R-Y, an input terminal 12 for inputting a color-difference signal B-Y, low pass filters (LPF) 14, 16 for limiting a band of the color-difference signals R-Y, B-Y input to the input terminals 10, 12, respectively. Clamping circuits 18, 20 are provided for clamping a pedestal level of the color-difference signals to a predetermined level (e.g., in the case where an A/D converted color-difference signal is 8 bits, the predetermined level corresponds to "128" level), and A/D converters 22, 24 are coupled to the clamping circuits 18, 20, respectively.

Mean circuits 26, 28 are also provided for sampling the pedestal portion of digital color-difference signals output from the A/D converters 22, 24 n times, and for outputting the difference value between the average value of the sampled values, which are sampled n times, and the predetermined pedestal level (i.e., "128" level in this case), respectively.

The mean circuit 28 may have the same construction as the mean circuit 26 whose detail is shown in FIG. 1. A detailed explanation of the mean circuit 26 will be provided hereinafter.

Subtracters 30, 32 are provided for subtracting the difference value output from the mean circuits 26, 28 from the output of the A/D converters 22, 24, respectively.

The chroma encoder also includes a gate circuit 34, conversion circuits 36, 38 (of the complements-of-two type) for AM modulation, a D flip-flop 40 as a delay circuit, a multiplexer 42, a D/A converter 44, and a band pass filter (BPF) 46.

Each of the conversion circuits 36, 38 is a complements-of-two circuit structured with a exclusive-OR logic circuit and an adder as shown in FIG. 1. A frequency dividing circuit 48 is provided for forming a first clock signal having a frequency 2 fsc (fsc indicates a chrominance subcarrier frequency) and a second clock signal having a frequency fsc, from a reference clock signal having a frequency 4 fsc.

The mean circuit 26 includes a control circuit 50 for controlling the mean circuit 26 generally, a latch circuit 52, an adder 54, and a latch circuit 56 for latching the output of the adder 54. Also included are a divider 58 for performing a calculation of 1/n on an output of the latch circuit 56, a subtracter 60 for subtracting a pedestal level value "128" from an output of the divider 58, and a latch circuit 62 for latching an output of the subtracter 60.

The output of the latch circuit 56 is fed back to the adder 54, and the n signal values of the pedestal portion of the digital color-difference signal are accumulated in the latch circuit 52, the adder 54, and the latch circuit 56. The divider 58 calculates an average value of the n signal values.

Figure 2:
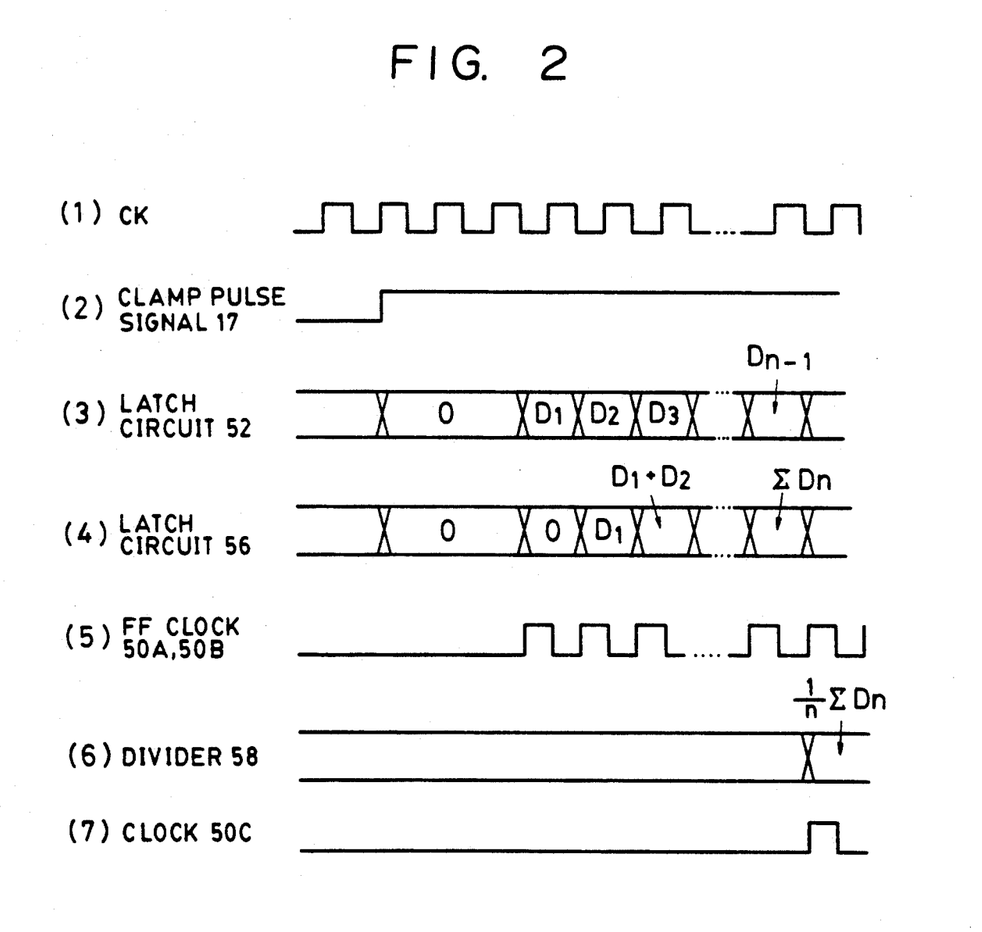
FIG. 2 is a operating timing chart of the mean circuit 26 in FIG. 1.

An operation of the mean circuit 26 will be described below with reference to FIG. 2.

A clamp pulse signal 17 is supplied from a signal generator (not shown) for determining each clamp position of the clamp circuits 18, 20, and is also applied to the control circuit 50, and the control circuit 50 clears the latch circuits 52, 56 in accordance with the clamp pulse signal 17. The control circuit 50 also applies (n+1) FF clock signals 50A, 50B, which instruct the latch circuits 52, 56 to receive the input signal, to the latch circuits 52, 56 after receiving a predetermined number m of clock signal pulses. Thus, as illustrated in FIG. 2, the latch circuit 56 holds the accumulated value of the n sampled values, each of which is obtained by sampling the pedestal portion of the digital color-difference signal R-Y.

The divider 58 divides the accumulated value by n, and outputs the average value.

The mean circuit 26 can find the value of the gap between the pedestal level of the input color-difference signal R-Y and the predetermined pedestal level by subtracting the predetermined pedestal level "128" from the average value in the subtracter 60.

The output of the subtracter 60 is latched by the latch circuit 62 and is held until the appearance of the next pedestal portion.

As described above, the mean circuit 26 outputs a signal, which indicates the amount of the gap between the pedestal level of the input color-difference signal R-Y and the predetermined pedestal level, to the subtracter 30.

An operation of the chroma encoder in FIG. 1 will be described below.

The band of each of the color-difference signals R-Y, B-Y input to the input terminals 10, 12 is limited by the low-pass filters 14, 16 and each pedestal level is clamped to the predetermined level by the clamping circuits 18, 20, and each of the clamped color-difference signals is digitized by the A/D converters 22, 24.

As described above, each of the mean circuits 26, 28 calculates the amount of the gap between the pedestal level of the digital color-difference signal and the predetermined pedestal level using outputs of the A/D converters 22, 24. And each of the subtracters 30, 32 subtracts the amount of the gap from the digital color-difference signal.

Accordingly, the gap of the clamp level, which was caused by the clamping circuits 18, 20, is corrected completely in the outputs of the subtracters 30, 32. The gate circuit 34 adds a burst flag BF (fixed value) to the output of the subtracter 32, and the conversion circuit 38 executes AM modulation on the output of the gate circuit 34.

The D flip-flop 40 performs time base compression on the output of the conversion circuit 38 by using a clock signal of frequency 4 fsc.

The conversion circuit 36 converts the output of the subtracter 30 into a complement of two.

The multiplexer 42 performs time base multiplexing on the output of the conversion circuit 36 and the output of the D flip-flop 40, and the D/A converter 44 converts the output of the multiplexer 42 into an analog signal.

The desired analog chroma signal can be obtained by limiting the band of the output of the D/A converter 44 by using the bandpass filter 46.

Figure 3:
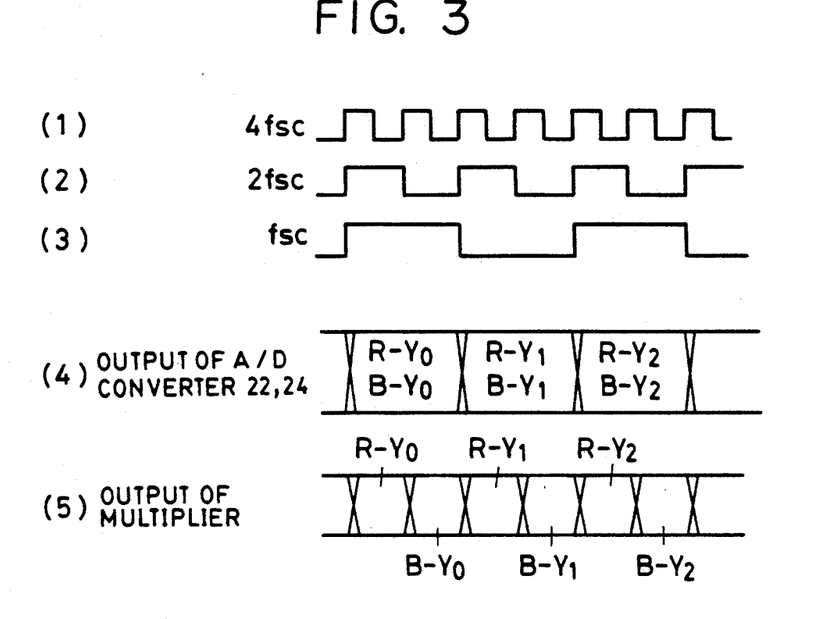
FIG. 3 is a operation timing chart for signals produced in the circuit shown in FIG. 1.

FIG. 3 shows the timing of the reference clock signal having the frequency 4 fsc, the first clock signal having the frequency 2 fsc, and the second clock signal having the frequency fsc. Each of the first and the second clock signals is formed from the reference clock signal by the dividing circuit 48. The output signals of the A/D converters 22, 24, and the output signal of the multiplexer 42 are also shown in FIG. 3.

In FIG. 1, the analog color-difference signal is digitized into the 8 bit digital color-difference signal. However, it should be understood that the present invention is not limited to the 8 bit signal. The present invention can also apply to a circuit for obtaining PAL standard chroma signals.

Embodiment 2

Figure 4:
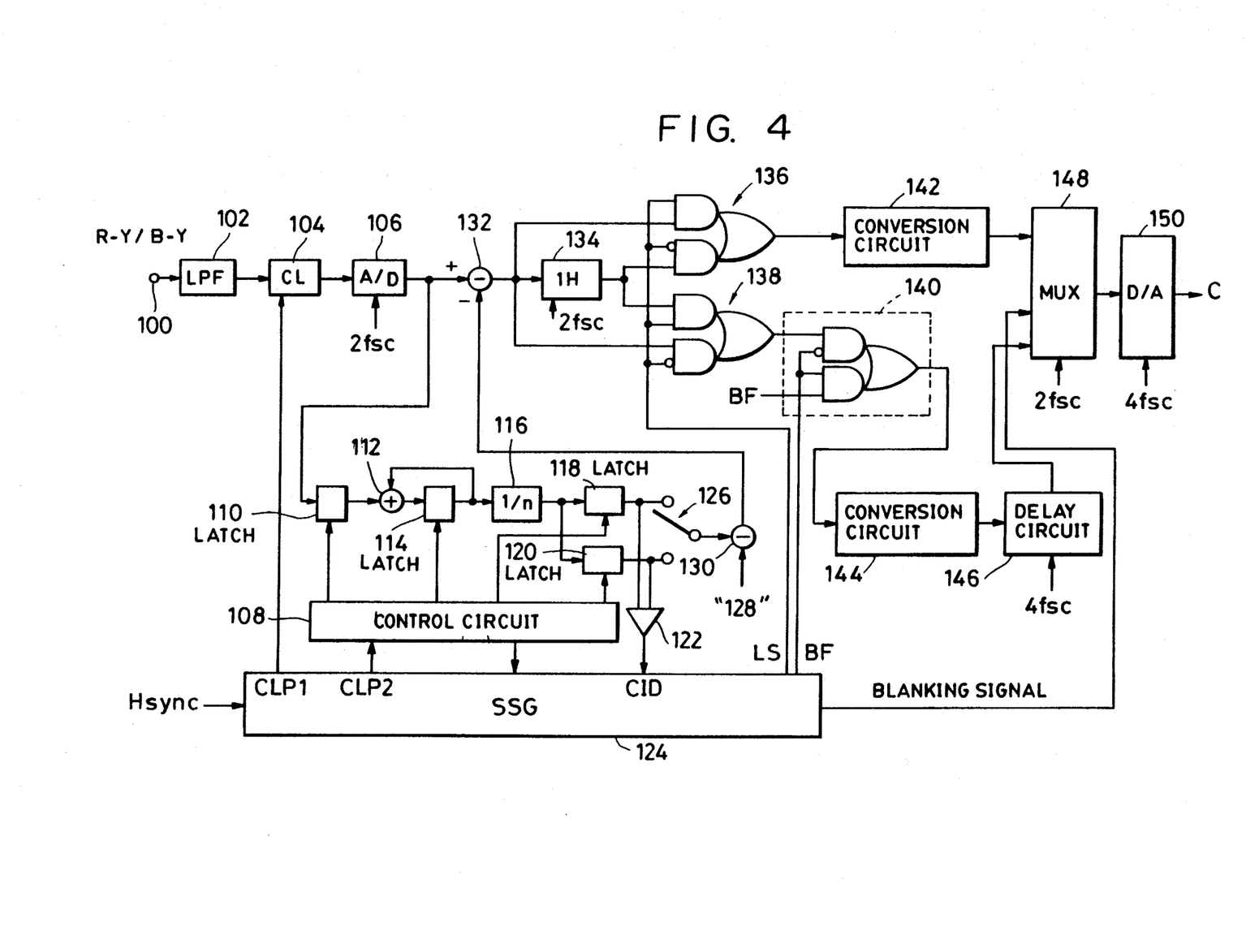
FIG. 4 is a block diagram for explaining a second embodiment of the present invention.

FIG. 4 is a block diagram of a second embodiment of the present invention.

The second embodiment shows a still video recording/reproducing apparatus to which the present invention is applied.

The input signals of the chroma encoder should be color-difference line sequential signals because the still video recording/reproducing apparatus executes line sequential recording of the color-difference signals on a recording medium.

Figure 5:
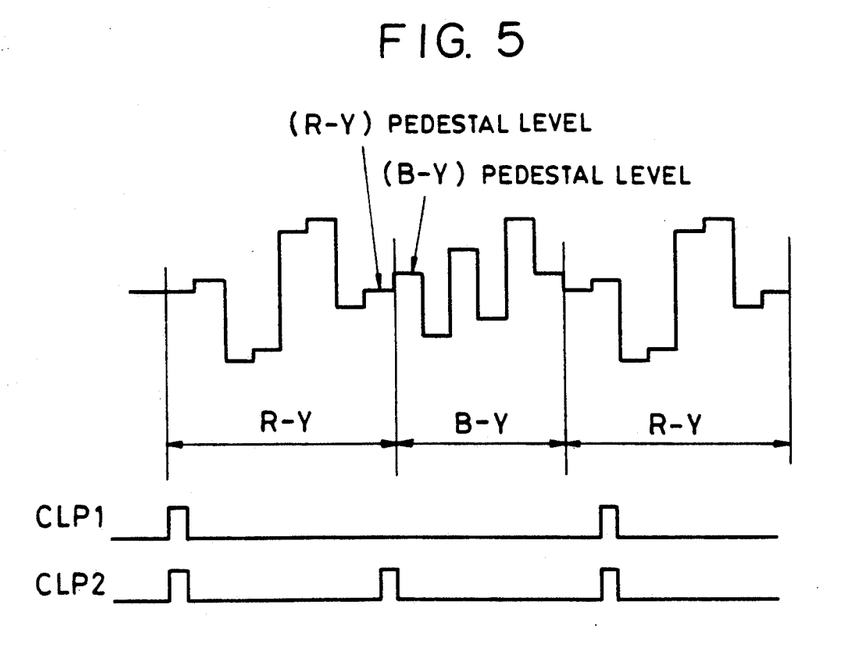
FIG. 5 shows waveforms of differential color line sequential signals produced in the FIG. 4 embodiment.

That is, as can be seen in FIG. 5, each of the color-difference signal R-Y and the color-difference signal B-Y is represented alternately as the sequential signals, and different values for indicating whether the current signal is the color-difference signal R-Y or the color-difference signal B-Y are assigned to each of the pedestal levels of the color-difference signals R-Y, B-Y.

In the conventional chroma encoder, the different values of the pedestal levels have been removed by converting the color-difference line sequential signals into the different color-difference signals output simultaneously, and by clamping the different color-difference signals respectively.

However, according to the second embodiment, the different values of the pedestal levels can be removed at the same time.

The band of the color-difference line sequential signals input to an input terminal 100 is limited by a low-pass filter (LPF) 102, and each pedestal level is clamped to a predetermined level by a clamping circuit 104.

As illustrated in FIG. 5, a clamp pulse signal CLPI, which is received by the clamping circuit 104, is generated once per two lines.

An A/D converter 106 is provided for digitizing the output of the clamping circuit 104.

A latch circuit 110, an adder 112, and a latch circuit 114, each of which is controlled by a control circuit 108, are provided for sampling the pedestal portion of the output signal output from the A/D converter 106 n times, and for calculating an accumulated value of the n sampled values.

A divider 116 is provided for dividing the accumulated value by n, and for outputting the average value. The operation of the latch circuit 110, the adder 112, the latch circuit 114, and the divider 116 may be the same as the operation of the mean circuits 26, 28. The output of the divider 116 is latched by the latch circuit 118 or the latch circuit 120 alternately for each line.

At the beginning, it is unknown which of the latch circuits 118, 120 latches the output of the divider 116. A comparator circuit 122 is provided as a chroma identity discrimination circuit (CID), for comparing the outputs of the latch circuits 118, 120, and for deciding the polarity of line switching described later. That is, in the case where the value of the latch circuit 120 is greater than the value of the latch circuit 118, the term for latching the output of the divider 116 by the latch circuit 120 corresponds to the term of the color-difference signal B-Y.

At this time, a synchronizing signal generating circuit 124 changes a line switching control signal (LS) into a low level signal.

On the contrary, in the case where the value of the latch circuit 120 is smaller than the value of the latch circuit 118, the synchronizing signal generating circuit 124 changes the line switching control signal into a high level signal. After that, the line switching control signal (LS) is reversed by a horizontal synchronizing signal (Hsync).

A switch 126 is provided for selecting outputs of the latch circuits 118, 120 alternately for each line, and for applying the selected output to a subtracter 130.

The subtracter 130 subtracts the pedestal level "128" from the selected output and applies the calculation output to a subtracter 132.

The subtracter 132 subtracts the output of the subtracter 130 from the output of the A/D converter 106.

According to the above-described structure, the pedestal level of each of the color components in the digital color-difference line sequential signals should be equal to the "128" level exactly. The output of the subtracter 132 is applied to a one line delay circuit 134 and switches 136, 138. The switches 136, 138 select the output of the subtracter 132 or the output of the delay circuit 134 alternately for each line in accordance with the above mentioned line switching control signal (LS) for converting the color-difference line sequential signals into the different color-difference signals output simultaneously.

That is, the output of the line switch 138 corresponds to the color-difference signal B-Y, and the output of the line switch 136 corresponds to the color-difference signal R-Y.

The following circuits in FIG. 4 are constructed like the circuits in FIG. 1 in such a way that a gate circuit 140 adds a burst flag to the color-difference signal B-Y output from the line switch 140, and conversion circuits 142, 144 (of the complements-of-two type) execute AM modulation.

A delay circuit 146 and a multiplexer 148 are provided for converting the outputs of the conversion circuits 142, 144 into the NTSC standard chroma signals. Needless noise or the like can be removed in multiplexer 148 using a blanking signal output from the synchronizing signal generating circuit 124.

A D/A converter 150 is provided for converting the output of the multiplexer 148 into an analog chroma signal.

At the beginning, it is unknown which of the color components R-Y, B-Y in the color-difference line sequential signals corresponds to the clamp signal (CLPl). However, it is determined in such a way that the clamp signal (CLPl) always appears at the portion of the color-component R-Y after the decision of the polarity of the line switching control signal (LS) made by comparator 122.

A control pulse signal (CLP2), which is applied to the control circuit 108 from the synchronizing signal generating circuit 124, is provided for regulating the operation timing of a mean circuit including all of the circuits from the latch circuit 110 through the subtracter 130. The control pulse signal (CLP2) is generated one time per line.

In the second embodiment, the color-difference component of each line is discriminated by the outputs of the latch circuits 118, 120. However, it is also possible to discriminate the color-difference component of each line by using the accumulated value of the n sampled values or the output of the subtracter 130.

In the second embodiment, the pedestal level of each of the color-difference signals R-Y, B-Y is corrected exactly to the predetermined level using the color-difference line sequential signals.

If the different color-difference signals output simultaneously are used for correcting the pedestal levels, two level correction circuits will be required. However, according to the second embodiment, it is possible to miniaturize the chroma encoder circuit because the color-difference line sequential signals are used for correcting the pedestal levels, and only one level correction circuit is required.

Further miniaturization of the chroma encoder circuit can be realized, since each discriminating operation of each of the color components in the color-difference line sequential signals is performed at the same time.

As mentioned above, according to the present invention, the pedestal level of each of the color-components can be adjusted correctly to a desired value. Accordingly, the precise adjustment of the clamp processing is not required. It is possible to form a chroma signals which are not affected even if the character of the clamp processing has changed by a change of temperature.

Although particular embodiments of the present invention are herein disclosed for purposes of explanation, various modifications thereof, after study of this specification, will be apparent to those skilled in the art to which the invention pertains.

The specific structural details of the devices represented by blocks in the schematic diagrams of FIGS. 1 and 4 are per se well known or could be readily constructed by the person of ordinary skill in this field without undue experimentation. Therefore, the exact structure of the blocks in the schematics is not described in further detail in order to more clearly describe the present invention, and since such details are not critical to the best mode of carrying out the present invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded broadest interpretation so as to encompass all such modifications and equivalent structures and functions.

While the foregoing embodiments describe a chroma encoder for processing color-difference signals, the present invention is not limited to these embodiments. For example, an apparatus for processing R-signal or B-signal can also be provided in accordance with the present invention.

What is claimed is:

1. A chroma encoder comprising:
   input means for inputting color signals;
   an A/D converter for converting the input color signals into digital color signals;
   sampling means for sampling the pedestal level of the digital color signals a predetermined number of times;
   discrimination means for discriminating a color-difference component of each line using the pedestal levels of the digital color signals;
   a calculator for calculating a difference value between an average value of the sampled values and a predetermined value;
   a subtracter for subtracting the difference value output from said calculator from the digital color signals to produce corrected color signals; and
   encoding means for encoding the corrected color signals output from said subtractor into a chroma signal, said encoding means converting the corrected color signals output from said subtracter into two different color-difference signals output simultaneously in accordance with the discrimination result of said discrimination means.

2. A chroma encoder according to claim 1, wherein said encoding means includes a modulator for performing digital AM modulation on the output of said subtracter.

3. A chroma encoder according to claim 1, further comprising a clamping circuit for clamping the pedestal level of the input color signals.

4. A chroma encoder according to claim 1, wherein said encoding means includes:
   a D/A converter for converting the chroma signal into an analog chroma signal; and
   a filter for limiting a band of the analog chroma signal.

5. A chroma encoder comprising:
   input means for inputting an analog color signal;
   an A/D converter for converting the analog color signal into a digital color signal;
   a calculator for sampling the pedestal level of the digital color signal a predetermined number of times, and for calculating a difference value between an average value of the sampled values and a predetermined value;
   discrimination means for discriminating a color-difference component of each line using the pedestal levels sampled by said calculator;
   a subtracter for subtracting the difference value output from said calculator from the digital color signal; and
   combining means for performing digital AM modulation on the output of said subtracter, and, for combining two digital AM modulated color signals to cause the two digital AM modulated color signals to have different phases at 90 degrees in relation to each other, said combining means converting a digital line sequential signal output from said subtracter into two different color-difference signals output simultaneously in accordance with the discrimination result of said discrimination means.

6. A chroma encoder according to claim 5 further comprising a clamping circuit for clamping the pedestal level of the input analog color signal.

7. A chroma encoder according to claim 6, further comprising a D/A converter for converting the output of the combining means into an analog chroma signal; and
   a filter for limiting a band of the analog chroma signal.

8. A chroma encoder for forming a chroma signal from an analog color line sequential signal having different offset degrees in their pedestal portions, comprising:
   an A/D converter for converting the analog color-difference line sequential signal to a digital color-difference line sequential signal;
   a calculator for sampling each pedestal level of color components of the digital color-difference line sequential signal a predetermined number of times, and for calculating a difference value between an average value of the sampled values and a predetermined value;
   a subtracter for subtracting the output of said calculator from the digital color difference line sequential signal;
   discrimination means for discriminating the color-difference component of each line using the pedestal levels of the digital color difference line sequential signal; and combining means for converting the digital color-difference line sequential signal output from said subtracter into two different color-difference signals output simultaneously in accordance with a discrimination result by said discrimination means, for performing digital AM modulation of the two different color-difference signals, and for combining the two digital AM modulated color signals to cause the two digital AM modulated color-difference signals to have different phases at 90 degrees in relation to each other.

9. A chroma encoder according to claim 8, further comprising a clamping circuit for clamping the analog color-difference line sequential signal.

10. A chroma encoder according to claim 9, further comprising a D/A converter for converting the output of the combining means into an analog chroma signal.

11. A chroma encoder comprising:

supply means for supplying digital color-difference signals;

correction means for correcting the digital color-difference signals by sampling the pedestal level of the digital color-difference signals a plurality of times and by subtracting a predetermined value corresponding to the sampled pedestal level from the digital color-difference signals;

discrimination means for discriminating a color-difference component of each line using the pedestal levels sampled by said correction means;

digital encoding means for encoding the corrected digital color-difference signals into a digital chroma signal, said digital encoding means converting the corrected digital color-difference signals output from said correction means into two difference color-difference signals output simultaneously in accordance with the discrimination result of said discrimination means; and means for converting the digital chroma signal encoded by said encoding means into an analog chroma signal.

12. A chroma encoder according to claim 11, further comprising an A/D converter, coupled to said supply means, for converting analog color-difference signals into digital color-difference signals.

13. A chroma encoder according to claim 11, wherein said digital encoding means includes complements-of-two conversion circuits.

14. A chromic encoder according to claim 11, further comprising modulation means, coupled to said digital encoding means, for amplitude-modulating the digital chroma signal.

15. A chroma encoder comprising:

supply means for supplying digital color-difference signals;

correction means for correcting the digital color-difference signals by sampling the pedestal level of the digital color-difference signals a plurality of times and by subtracting a predetermined value corresponding to the sampled pedestal level from the digital color-difference signals;

digital encoding means for multiplexing the digital color-difference signals and for generating a single digital chroma signal; and means for converting the single digital chroma signal encoded by said encoding means into an analog chroma signal.

* * * * *

UNITED STATES PATENT AND TRADEMARK OFFICE
CERTIFICATE OF CORRECTION

PATENT NO. : 5,245,415
DATED : September 14, 1993
INVENTOR(S) : TOSHIHIKO MIMURA It is certified that error appears in the above-indentified patent and that said Letters Patent is hereby corrected as shown below:

COLUMN 5:

Line 26, "signal CLPI," should read --signal CLP1,--.

COLUMN 7:

Line 21, Close up right margin;
    Line 22, Close up left margin; and
    Line 55, "ferent" should read --ference--.

COLUMN 8:

Line 41, "claim 5" should read --claim 5,--;
    Line 45, "comprising a D/A" should read
    --comprising:
        ¶ a D/A--; and
    Line 65, "color difference" should read
    --color-difference--.

UNITED STATES PATENT AND TRADEMARK OFFICE
CERTIFICATE OF CORRECTION

PATENT NO. : 5,245,415
DATED : September 14, 1993
INVENTOR(S) : TOSHIHIKO MIMURA It is certified that error appears in the above-indentified patent and that said Letters Patent is hereby corrected as shown below:

COLUMN 9:

Line 1, "color difference" should read --color-difference--.

COLUMN 10:

Line 2, "difference" should read --different--; and
    Line 15, "chromic" should read --chroma--.

Signed and Sealed this

Thirty-first Day of May, 1994

Attest:

BRUCE LEHMAN

Attesting Officer     Commissioner of Patents and Trademarks